(12) United States Patent
Franke et al.

(10) Patent No.: US 6,729,300 B2
(45) Date of Patent: May 4, 2004

(54) METHOD FOR THE KNOCK REGULATION OF AN INTERNAL COMBUSTION ENGINE, IN PARTICULAR ON A MOTOR VEHICLE

(75) Inventors: Steffen Franke, Schwieberdingen (DE); Martin Haussmann, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 10/048,523

(22) PCT Filed: May 4, 2001

(86) PCT No.: PCT/DE01/01318
§ 371 (c)(1),
(2), (4) Date: May 24, 2002

(87) PCT Pub. No.: WO01/92717
PCT Pub. Date: Dec. 6, 2001

(65) Prior Publication Data
US 2002/0148440 A1 Oct. 17, 2002

(30) Foreign Application Priority Data
May 30, 2000 (DE) .......................................... 100 26 755

(51) Int. Cl.[7] ................................................. F02P 5/00
(52) U.S. Cl. .............................. 123/406.21; 123/406.29
(58) Field of Search ..................... 123/406.21, 406.29, 123/406.34, 406.35; 73/35.01

(56) References Cited

U.S. PATENT DOCUMENTS 4,819,603 A * 4/1989 Morita et al. .......... 123/406.21
5,000,150 A * 3/1991 Miyama et al. ........ 123/406.33
5,235,953 A * 8/1993 Kato et al. ............... 123/406.3
5,411,000 A * 5/1995 Miyashita et al. ..... 123/406.35

FOREIGN PATENT DOCUMENTS

DE         43 00 406           7/1994
DE            4300406 A1  *  7/1994    ............. F02P/5/15
DE         197 40 365          3/1999
DE          019740365 A1  *  3/1999    ............ F02P/5/152

* cited by examiner

*Primary Examiner*—Mahmoud Gimie
(74) *Attorney, Agent, or Firm*—Kenyon & Kenyon

(57) ABSTRACT

A method for regulating knocking in an internal combustion engine, particularly of a motor vehicle, has the following steps: determining a knocking combustion for a calculated first base ignition angle in one or more cylinders of the internal combustion engine originated from a previous operating condition; and setting a new, second base ignition angle taking into account the existing operating condition. A query concerning the relative sizes of a setpoint ignition angle for efficiency reduction and the first base ignition angle is provided for setting the second base ignition angle to allow for knocking regulation which is favorable to the operation. If the setpoint ignition angle is smaller than the base ignition angle, an ignition angle retardation is performed with an adjustment value that must be adjusted, and which is given by the sum of a previously determined, constant retardation value and an adjusted, variable retardation value.

7 Claims, 2 Drawing Sheets

METHOD FOR THE KNOCK REGULATION OF AN INTERNAL COMBUSTION ENGINE, IN PARTICULAR ON A MOTOR VEHICLE

FIELD OF THE INVENTION

The present invention relates to a method for regulating knocking in an internal combustion engine, particularly of a motor vehicle, having the following steps:—determining a knocking combustion for a calculated first base ignition angle in one or more cylinders of the internal combustion engine originating from a previous operating condition; and setting a new, second base ignition angle taking into account the existing operating condition.

BACKGROUND INFORMATION

Methods are known for regulating knocking to avoid knocking combustion in an internal combustion engine cylinder by setting a suitable base ignition angle. The base ignition angle is defined as the earliest admissible angle prior to which knocking combustion does not occur in the combustion engine. Since knocking combustion may occur independently in each cylinder of the internal combustion engine, the corresponding base ignition angle must be set individually for each cylinder. The respective value of the base ignition angle is derived from the sum of a basic ignition angle value, an ignition angle correction value, and an ignition angle retardation value. The ignition angle correction is used to compensate for the effects of temperature and engine speed in the determination and calculation of the base ignition angle. The ignition angle retardation is thus provided as an active element in regulating knocking. Accordingly, the base ignition angle defines a currently determined cylinder-specific knocking limit which changes while the internal combustion engine is running.

However, an active knocking regulation method can only determine and set the actual knocking limit, and thereby also the actual base ignition angle with a corresponding ignition angle retardation, if the control circuit, including the knocking regulation (as the regulating unit) and the internal combustion engine (as the regulated system), is closed. This means that knocking regulation must actually act on the internal combustion engine, that is to say on each cylinder individually in order to ensure that the actual ignition angle has the same value as the base ignition angle.

Moreover, a setpoint ignition angle is defined for a torque conversion for actions synchronized with the crankshaft. The setpoint ignition angle is a setpoint variable for efficiency reduction derived from an engine torque controller using an ignition retardation angle. The setpoint ignition angle is limited upwardly to the earliest admissible ignition angle, that is to say the respective base ignition angle, and downwardly to a latest admissible ignition angle. This setpoint ignition angle is used as the actual ignition angle when active torque intervention is present, and is therefore output to the ignition. If no active torque intervention is present, the base ignition angle is used as the actual ignition angle.

When active torque intervention is present, the knocking regulation circuit is interrupted, with the result that the value of the actual ignition angle is equal to the setpoint ignition angle, and not equal to the base ignition angle. Since the knocking regulation circuit has been interrupted, the knocking regulation system can only register changes in the actual knocking limit with a delay, if at all. The disadvantageous result is an unacceptable increase in the frequency of knocking.

SUMMARY OF THE INVENTION

The method according to the present invention for regulating knocking in an internal combustion engine, particularly of a motor vehicle, is characterized in that the second base ignition angle is set to produce good operating and knock regulating conditions via a query with respect to the relative size of a compensating setpoint ignition angle and the first base ignition angle. The provision of a query step before the ignition angle retardation makes it possible to distinguish among different operating modes with respect to the relative size of the setpoint ignition angle and the base ignition angle, and to initiate appropriate measures. In such a case, the capability to detect an operating mode wherein the setpoint ignition angle is smaller than the prevailing base ignition angle is particularly advantageous so that the fastest possible and highly effective knocking regulation can be initiated via an appropriate ignition retardation angle. The appropriate ignition retardation angle can then be set using a variable and adjusted retardation value that is defined by the relationship between the setpoint ignition angle and the existing base ignition angle.

The query preferably provides for two decision options. Since only the operating mode where the setpoint ignition angle is smaller than the optimal ignition value is to be identified, a corresponding query with two decision options (yes or no) is appropriate.

In the event that the setpoint ignition angle is smaller than the first base ignition angle, the query is advantageously followed by ignition angle retardation by an adjustment value which is set anew and is formed from the sum of a previously determined, constant retardation value and an adjusted, variable retardation value. With an ignition angle retardation characterized in this way, that is to say one which is generated using a retardation value that is set anew based on the sum of a constant value and an adjusted value, fast and reliable knocking regulation may be achieved in particularly effective manner by appropriate selection of the adjusted value.

Advantageously, the ignition angle is retarded to set the second base ignition angle in a single regulating step. By appropriate selection of the adjusted retardation value, the ignition angle retardation for determining the second base ignition angle may be performed advantageously in a single regulating step. This allows reliable and particularly fast knocking regulation. Unacceptably frequent knocking combustion caused by the difference between the calculated (theoretical) and the actual base ignition angle (actual knocking limit) may be avoided by the provision of multiple constant, relatively small regulating steps.

The adjusted, variable retardation value is advantageously defined as the difference between the larger, first base ignition angle and the smaller setpoint ignition angle. An adjusted and variable retardation value defined in this way allows the second base ignition angle to be set using an ignition angle retardation in a single regulating step.

In the event that the setpoint ignition angle is greater than or equal to the first base ignition angle, the query is advantageously followed by an ignition angle retardation with an adjustment value that matches the previously determined, constant retardation value. Since in this operating mode the setpoint ignition value is not smaller than the first optimal ignition value, and there is accordingly no need to take into account an adjusted, variable retardation value to retard the ignition value, the adjustment value may be defined using a previously determined, constant retardation value.

Advantageously, the ignition angle is not retarded if knocking combustion does not occur with the first base ignition angle. If this further, alternative operating mode for combustion is considered, it is possible to create a closed regulating circuit for effective, reliable and fast knocking regulation of an internal combustion engine taking into account a variety of different operating conditions.

Further advantageous embodiments of the present invention are explained in the description.

DETAILED DESCRIPTION

Figure 1:
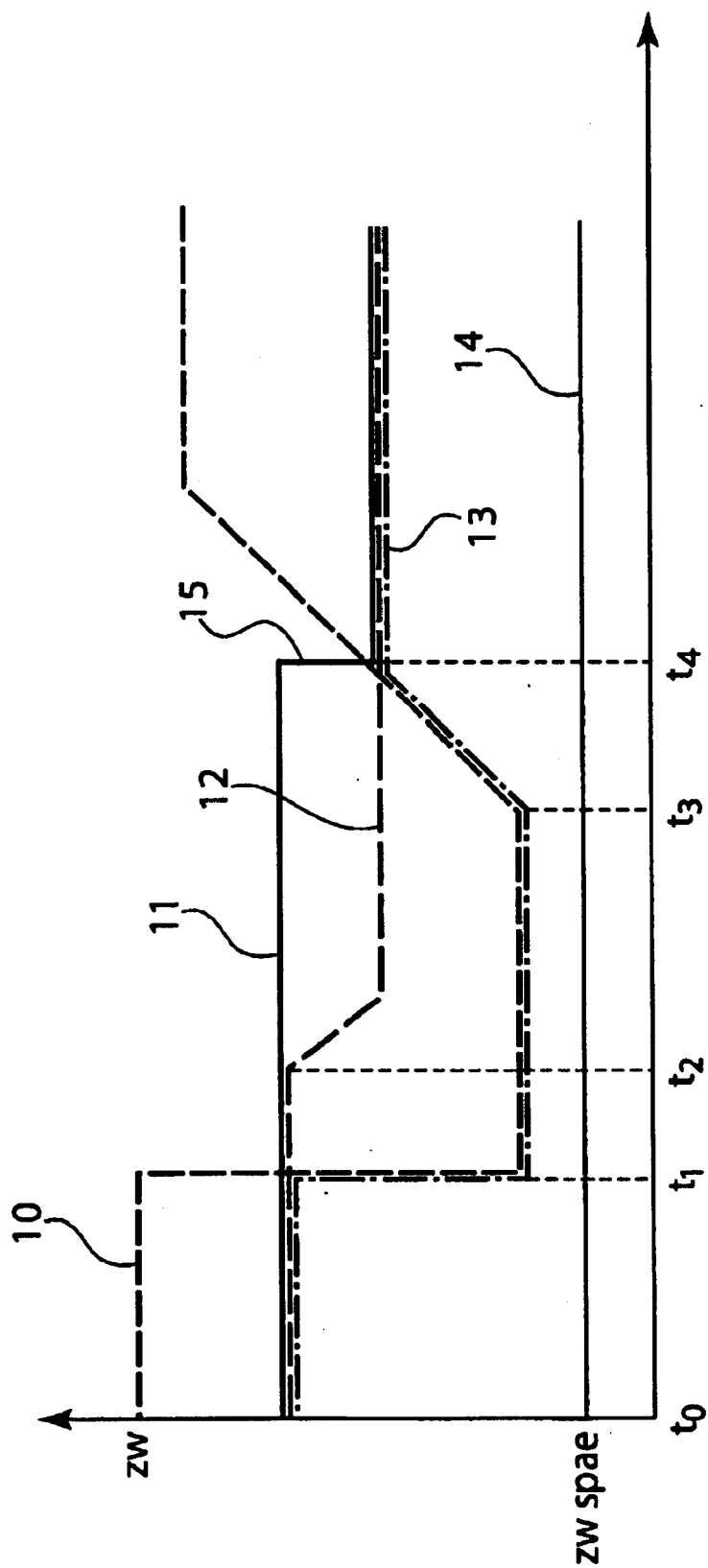
FIG. 1 shows a graph related to running time and with characteristic curves for various ignition angles.

FIG. 1 shows a graph related to running time with multiple ignition characteristic curves reflecting various operating conditions of an internal combustion engine.

A larger ignition angle zw then corresponds to an earlier ignition time and a smaller ignition angle zw corresponds to a later ignition time. In FIG. 1, characteristic curve 10 indicates the variation of the setpoint ignition angle, characteristic curve 11 indicates the variation of the calculated base ignition angle (first base ignition angle), characteristic curve 12 indicates the variation of the actual base ignition angle, characteristic curve 13 indicates the variation of the actual ignition angle, and characteristic curve 14 indicates the value of the latest admissible ignition angle as a function of operating time t. In the interval between $t_0$ and $t_1$, the knocking regulation circuit is closed, so that the knocking regulation regulates the actual ignition angle indicated by characteristic curve 13 to the value of the calculated base ignition angle indicated by characteristic curve 11. At this time, the value of the calculated base ignition angle (characteristic curve 11) is the same as the actual base ignition angle (characteristic curve 12). The setpoint ignition angle (characteristic curve 10) has a greater value than the actual ignition angle (characteristic curve 13) during period $t_0$ to $t_1$, which corresponds to an earlier setpoint ignition time.

At time $t_1$, a torque intervention is applied which causes setpoint ignition angle (characteristic curve 10) to be shifted instantly to a later ignition time (smaller ignition angle). The application of torque intervention interrupts the knocking regulation circuit, with the result that actual ignition angle (characteristic curve 13) is equal to setpoint ignition angle (characteristic curve 10). If the actual base ignition angle (characteristic curve 12) is now shifted to a smaller value (earlier ignition time) after $t_2$, for example due to a change in load and/or temperature conditions with the torque intervention still applied, yet the actual base ignition angle (characteristic curve 12) is still greater than the setpoint ignition angle (characteristic curve 10), the knocking regulator is no longer able to register such a shift of the actual base ignition angle (characteristic curve 12) with respect to the calculated base ignition angle (characteristic curve 11).

After time $t_3$, the torque intervention is no longer applied so that the knocking regulation circuit is closed again and the setpoint ignition angle (characteristic curve 10) is adjusted to the earlier ignition time (larger ignition angle values), and if necessary to the earlier value, by the knocking regulation circuit. Up to time $t_4$, the setpoint ignition angle (characteristic curve 10) corresponds to the actual ignition angle (characteristic curve 13).

After time $t_4$, the actual ignition angle (characteristic curve 13) reaches the value of the actual base ignition angle (characteristic curve 12), so that if the actual ignition angle even minimally exceeds the actual base ignition angle, which represents the actual knocking limit, knocking combustion results. Undoubtedly, this is detected by the active knocking regulator (closed knocking regulation circuit), so that the calculated (first) base ignition angle (characteristic curve 11) is adjusted for smaller ignition angles (later ignition times) until a second base ignition angle having the value of the actual base ignition angle (characteristic curve 12) is set. In such case, the calculated base ignition angle (characteristic curve 11) is preferably regulated to the actual base ignition angle (characteristic curve 12) using a single regulating step (curve 15). In this manner, in interval $t_3$ to $t_4$, that is to say, when the regulation circuit is closed again and knocking regulation reactivated, the actual ignition angle (characteristic curve 13) is increased constantly until it is equal to the actual base ignition angle (characteristic curve 12), thus preventing the disadvantageous situation wherein the actual ignition angle exceeds the actual base ignition angle by too large a margin at time $t_4$, and is subsequently regulated relatively slowly and under conditions allowing knocking combustion until it is again equal to the actual base ignition angle. Through the particularly fast and efficient ignition angle retardation according to curve 15, any knocking combustion is limited to a minimum after time $t_4$.

Figure 2:
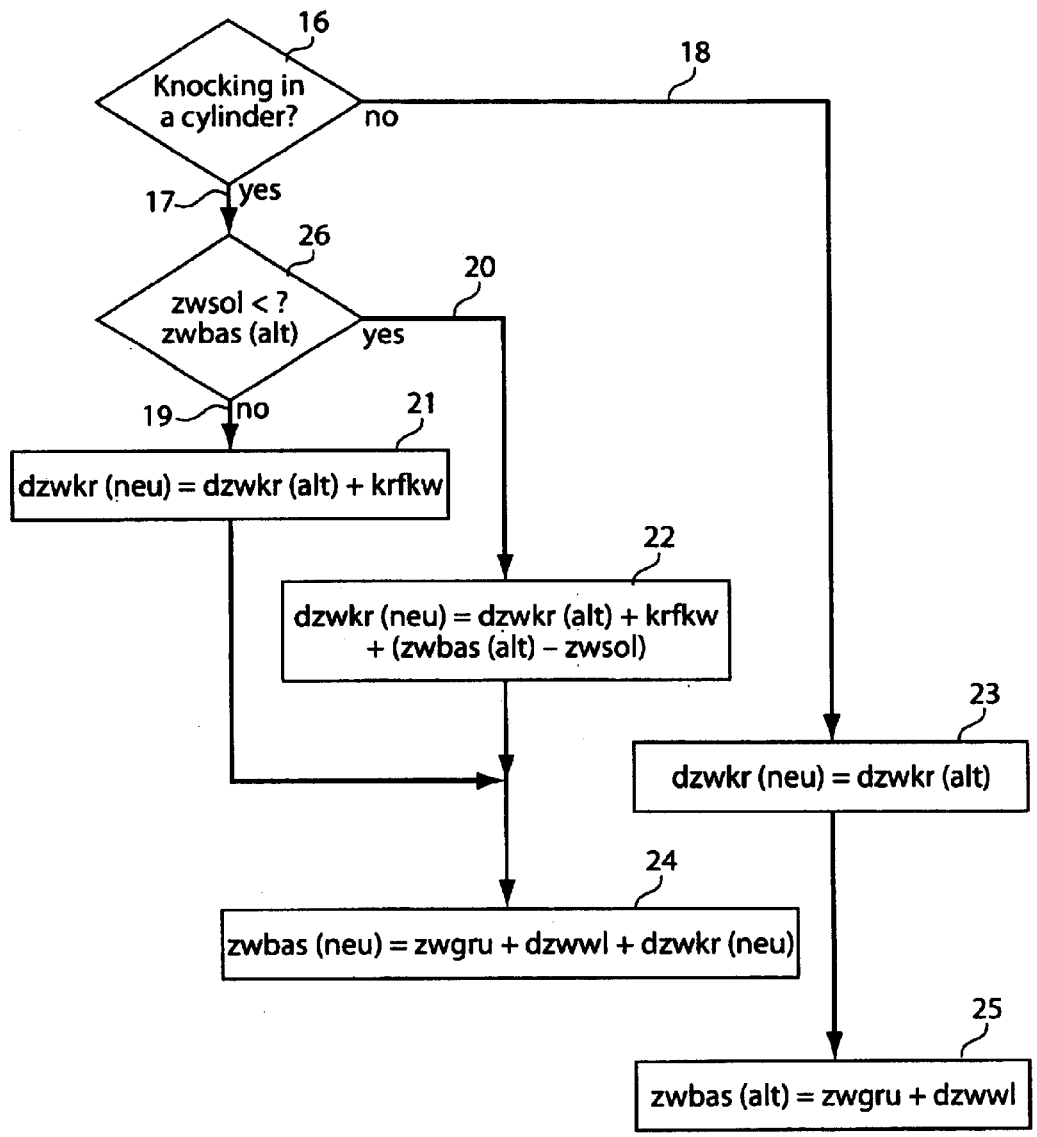
FIG. 2 shows a flow chart representing an adjustable ignition angle retardation.

FIG. 2 shows a flowchart representing an adjustable ignition angle retardation. In a block designated 16, a query takes place for the presence of knocking combustion in one or more cylinders of an internal combustion engine; the query may be answered with "yes" (arrow 17) or "no" (arrow 18). If the knocking combustion is confirmed (arrow 17) for a first base ignition angle (calculated base ignition angle) in one or more cylinders of the internal combustion engine, a query takes place (block 26) for the relative size of setpoint ignition angle zwsol and the existing base ignition angle zwbas(alt). The query allows two responses (yes-arrow 20/no-arrow 19) to the question whether the setpoint ignition angle zwsol is smaller than the base ignition angle zwbas(alt). If setpoint ignition angle zwsol is smaller than base ignition angle zwbas(alt) (arrow 20), ignition angle retardation dzwkr is carried out with an adjustment value dzwkr(neu) that is reset (block 22), and which is given by the sum of a previously determined, constant retardation value (dzwkr(alt)+krfkw), wherein krfkw is an unmodified, previously determined and constant ignition angle retardation value for each detected instance of knocking, and an adjusted, variable retardation value (zwbas(alt)−zwsol). The adjusted, variable retardation value is defined as the difference between the larger, current optimal ignition value zwbas(alt) (calculated base ignition angle as represented by characteristic curve 11 in FIG. 1) and the smaller setpoint ignition value zwsol. The adjusted, variable retardation value (zwbas(alt)−zwsol) is thus represented by curve 15 in FIG. 1 and represents the difference to be compensated between the optimal ignition value (characteristic curve 11) calculated at the earlier time $t_1$ and the actually existing knocking limit (characteristic curve 12) at time $t_4$. This ignition angle retardation dzwkr is thus used to adjust the calculated base ignition angle (characteristic curve 11 in FIG. 1) to the value of the actual base ignition angle (characteristic curve 12 in FIG. 1) so that the new, second base ignition angle zwbas(neu) (block 24) is generated from the sum of basic ignition angle value zwgru, ignition angle correction value dzwwl and ignition angle adjustment value dzwkr(neu).

If setpoint ignition angle zwsol is not smaller than base ignition angle zwbas(alt) (arrow 19), ignition angle dzwkr is retarded using an adjustment value dzwkr(neu) (block 21) that matches the previously determined, constant retardation value (dzwkr(alt)+krfkw).

If no knocking combustion occurs (arrow 18) with the existing base ignition angle zwbas(alt), the ignition angle is not retarded. In this operating mode, adjustment value dzwkr(neu) is equal to adjustment value dzwkr(alt) (block 23) and is stored for subsequent use as the adjustment value for knocking regulation in future instances of knocking combustion. In the embodiment represented in FIG. 2, this unchanged, stored adjustment value dzwkr(alt) is used for ignition angle retardation in blocks 21 and 22. If knocking combustion is not occurring, base ignition angle zwbas(alt) (block 25) that has been or is to be set for future knocking regulation is given by the sum of base ignition angle zwgru and ignition angle correction value dzwwl.

By the provision of a query and the definable adjustment value for a setpoint ignition angle that is smaller than the base ignition angle, it is possible to significantly reduce the frequency of knocking after time $t_1$, which in turn results in greater comfort (knocking noise), reduced wear (knocking damage) and improved driving performance of the vehicle. Since the situation wherein the actual ignition angle exceeds the actual optimal ignition (actual knocking limit) angle at time $t_4$ corresponds to an overshoot of the torque delivered, the method according to the present invention advantageously contributes to a significant reduction or complete elimination of knocking while the vehicle is in operation.

This method for regulating knocking in an internal combustion engine, particularly of a motor vehicle may be easily incorporated into existing regulating systems, in such manner that both ignition coordination and knocking regulation result therefrom.

What is claimed is:

1. A method for regulating a knocking in an internal combustion engine, comprising the steps of:

determining a knocking combustion for a calculated first base ignition angle in at least one cylinder of the internal combustion engine originating from a previous operating condition;

setting a new, second base ignition angle in accordance with an existing operating condition, wherein:

in order to set the second base ignition angle for a knocking regulation that is favorable to an operation, a query is performed concerning a relative size of a setpoint ignition angle and the first base ignition angle; and after the query, if the setpoint ignition angle is smaller than the first base ignition angle, performing an ignition angle retardation to set the second base ignition angle with an adjustment value that is to be set anew and that is given by a sum of a previously determined constant retardation value and an adjusted, variable retardation value.

2. The method according to claim 1, wherein:

the internal combustion engine is of a motor vehicle.

3. The method according to claim 1, wherein:

the query permits two decision options.

4. The method according to claim 1, wherein:

the ignition angle retardation is performed in a single regulating step.

5. The method according to claim 1, wherein:

the adjusted, variable retardation value is defined as a difference between the first base ignition angle and the setpoint ignition angle, the first base ignition angle being larger than the setpoint ignition angle.

6. The method according to claim 1, wherein:

after the query, if the setpoint ignition angle is at least as large as the first base ignition angle, an ignition angle retardation is performed with an adjustment value that corresponds to a previously determined, constant retardation value.

7. The method according to claim 1, wherein:

if the knocking combustion does not occur for the first base ignition angle, the ignition angle is not retarded.

* * * * *